United States Patent [19]

Koch et al.

[11] Patent Number: 4,482,223
[45] Date of Patent: Nov. 13, 1984

[54] PHOTOGRAMMETRICAL RECTIFICATION DEVICE AND METHOD OF DETECTING THE ADJUSTING VALUES FOR THE SAME

[76] Inventors: Raimund Koch, 24, Fritz-Ritter-Strasse, 6902 Jena-Lobeda, District of Gera; Paul Spata, 64, Hermann-Löns-Strasse, 6900 Jena, District of Gera, both of German Democratic Rep.

[21] Appl. No.: 388,687

[22] Filed: Jun. 15, 1982

[30] Foreign Application Priority Data

Jul. 22, 1981 [DD] German Democratic Rep. ... 231974

[51] Int. Cl.³ ............................................. G03B 23/08
[52] U.S. Cl. ...................................... 353/5; 353/101; 353/27 A; 353/121
[58] Field of Search ..................... 353/5, 6, 27 A, 101, 353/121; 33/1 A, 20 D, 1 M; 355/52, 44

[56] References Cited

U.S. PATENT DOCUMENTS

| | | | |
|---|---|---|---|
| 2,456,333 | 12/1948 | Sharp et al. | 353/5 |
| 3,449,048 | 6/1969 | Allison | 355/75 |
| 3,678,582 | 7/1972 | Helava et al. | 33/20 D |
| 3,687,547 | 8/1972 | Hobrough | 355/53 X |
| 4,325,188 | 4/1982 | Reinmold et al. | 33/1 M |

Primary Examiner—Harry N. Haroian

[57] ABSTRACT

The invention relates to a photogrammetric rectifying device and a method for determining the setting values for the same to perform rectification. The inventional device has at least one measuring mark non-displaceably arranged within the projection beam non-coincident to the optical axis of the projection objective. The coordinates of the measuring mark are known. By displacing a negative carrier and adjusting the magnification, while the angular elements of orientation are held at their zero positions, control points of said photograph projected on an easel are brought into coincidence with corresponding measuring marks, which are provided on the easel. The displacements of the negative carrier and the magnifications are measured. The resulting values and the known coordinates of the measuring marks are used to compute the photo coordinates of the control points. The setting values are the results of a projective transformation computation, which is based on the photo- and map-coorinates, only.

Finally, the computer automatically sets the rectifying device to the setting values.

3 Claims, 1 Drawing Figure

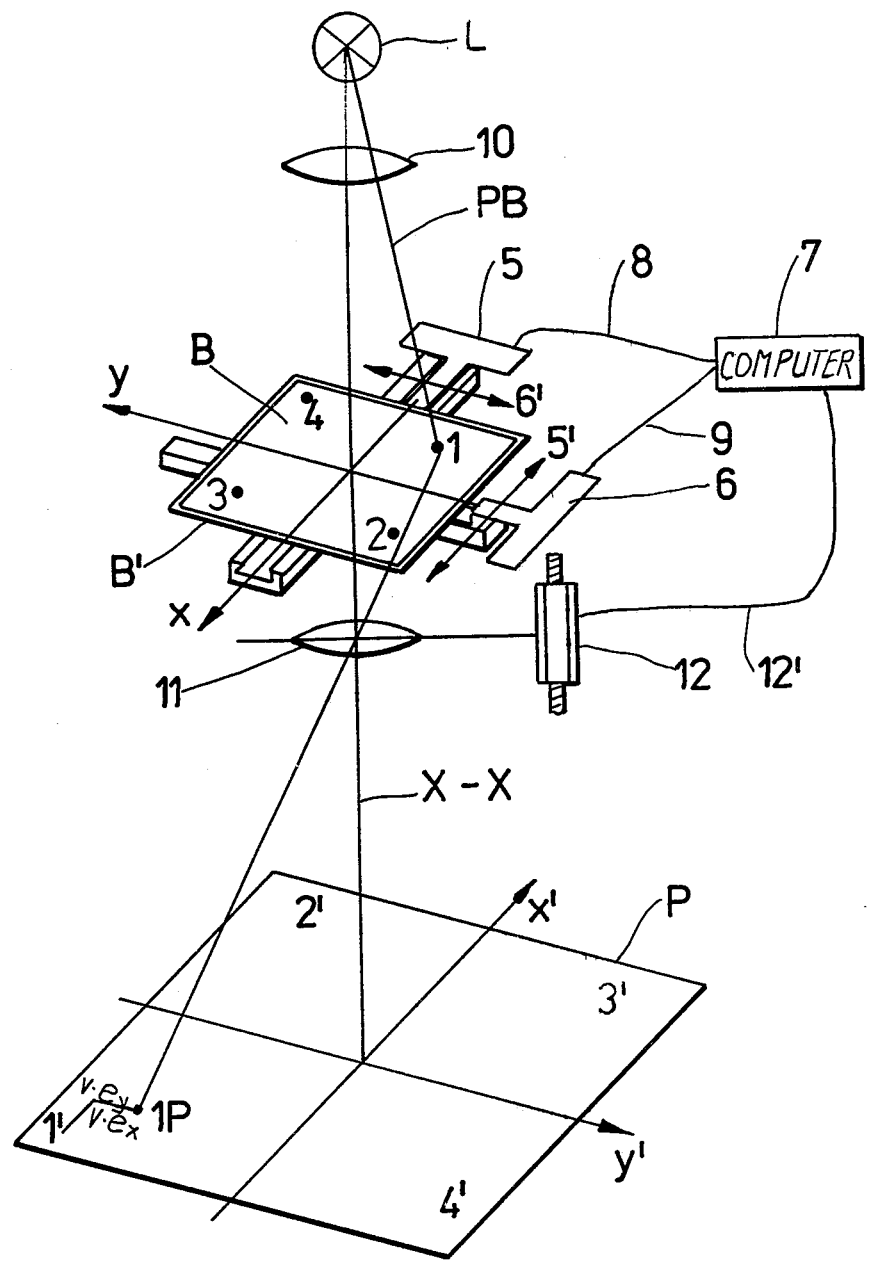

PHOTOGRAMMETRICAL RECTIFICATION DEVICE AND METHOD OF DETECTING THE ADJUSTING VALUES FOR THE SAME

The invention relates to a photogrammetrical rectification device and a method of determining the setting values for the same, constituted of a photograph carrier, a projection objective and a projection table, the latter being oriented relative to the photograph carrier, particularly for use in photogrammetric rectification operations in dependence on setting values.

The photograph carrier permits displacements which are measureable.

In the course of taking aerial photographs the latter are very often subject to distortions which are compensated for by perspective deformations obtained by displacing and/or tilting the photograph image carrier and the projection table, respectively, and varying the magnification of the projection objective. The setting values required for performing the rectification of the aerial photographs, that is, the respective values for these displacements, and tilts are obtained by two different methods. The first method operates under use of control points in the course of rectification.

A pattern including the nominal or ground positions of the control points is attached to the easel and by manual displacement and tilting operations the projections of the control points in the aerial photographs are aligned relative to the control points in the pattern.

This method is complicated and cumbersome and is highly demanding to the operator.

The second method involves a rectification under use of rectifier settings which are calculated and according to which the rectification device is set.

These values can, for example, be calculated from an aerial triangulation operation.

This method is disadvantageous because a triangulation is not performed to each aerial photograph to be rectified, since triangulation only for rectification purposes would be too expensive.

It is further known to measure the aerial photographs to be rectified in a two-coordinate measuring device and to compute the rectifier setting values from the photo or actual coordinate values and the known ground or nominal coordinate values of the control points. This considerably increases the expenditures in devices. To eliminate this disadvantage it is known to provide the easel of a rectifying device additionally with a coordinate measuring device, which is a cable-operated measuring device, constituted of two cable units including a rotary holder and a cursor having an adjustment marking coupled to the cables. Furthermore, an external computer is provided. This arrangement determines the coordinates of a control point of an aerial photograph projected upon easel. The setting values obtained from the aerial photograph and from the known nominal control points are computed by means of a computer program and, thus, the coordinates of an aerial photograph projected upon the projection easel are determined. This arrangement is disadvantageous because of the considerable expenditures involved for the additional coordinate measuring device, apart from the comparatively poor measuring precision obtained.

It is an object of the present invention to obviate the above disadvantages.

It is a further object of the present invention to provide a device and method for determining the adjustment or setting values in a photogrammetric rectifying device which is simple, unexpensive and precise.

These and other objects are realised in a device for photogrammetric rectification comprising a photograph carrier, a projection objective and a projection table, means for orienting the photograph carrier relative to the projection table, and vice versa, by displacing the image carrier in two coordinate directions in parallel to the photograph plane, and means for measuring the displacements.

At least one non-displaceable measuring marking is provided in the projection path of beams non-coincident to the optical axis of the projection objective on the projections table.

Advantageously, the projection table is subdivided into four quadrants and one non-displaceable measuring mark is arranged in each of said quadrants of said projection table.

A method for determining the setting values of the inventional rectification device comprises the steps of:

displacing the image carrier to which a photograph to be rectified is mounted and/or varying the magnification, thus a control point is aligned relative to one of the non-displaceable measuring marks, measuring and storing the size of the displacements and of the magnification, repeating the steps of displacing and of measuring for at least two further control points of the photograph to be rectified, and computing the setting values from the size of the individual displacements and/or magnifications and from the known nominal coordinate values.

In order that the invention may be more readily understood reference is made to the accompanying drawing which illustrates diagrammatically and by way of example one embodiment thereof and where the FIGURE is a schematic view of a rectification device.

BRIEF DESCRIPTION OF THE DRAWING

The sole FIGURE shows the general arrangements of the invention.

A photograph B to be rectified is arranged in a projection beam PB originating from a light source L.

The projection beam PB is shaped by a condenser lens 10 subsequently arranged to said light source L.

The photograph B is mounted on a carrier B which, in turn, is connected to displacement means 5 and 6 for displacing the carrier in the directions indicated by the arrows 5' and 6', respectively. The displacement means 5 and 6 are connected via lines 9 and 8, respectively, to a computer 7. The photograph carrier is followed by an objective 11 having an axis x—x, and a projection table P having tilting axes x' and y'. Said light source L, said condenser lens 10, said photograph carrier, and said projection table P are arranged in optical alignment about the axis x—x. The photograph B is provided with a fixed control point 1, 2, 3, 4.

The projection table P is provided with four measuring marks 1', 2', 3', 4'.

In operation, the photograph B to be rectified is illuminated by the light source L to project the four control points 1, 2, 3, 4 onto the projection table P via the objective 11.

By operating the displacement means 5 and 6 along the directions 5' (y-coordinate) and 6' (x-coordinate) and by varying the magnification of the objective 11 the projection $1^P$ of the control point 1 is brought into coincidence with the most suitably located measuring marks, which is marks 1' in the drawing.

Subsequently the projections of the further points 2, 3 and 4 are aligned to the underneath marks 2', 3' and 4' on the projection table P. At least three alignments are necessary.

The magnification of the objective 11 is varied by operating adjustment means 12. After each alignment operation, for example, 1 to 1', the individual displacements $e_x$ and $e_y$ of the means 5 and 6, respectively, are measured and fed into the computer 7 via the lines 8 and 9, respectively. Furthermore the magnification v, obtained from the objective focusing, if any, is also fed into the computer 7 via a connection 12' to the objective 11.

The photo coordinates $x_i$ and $y_i$ of the control points 1 to 4 of the photograph B are calculated with the given coordinates $x'_i$ and $y'_i$ of the measuring marks 1' to 4' of the projection P according to $$x_i = e_{xi} + \frac{x'_i}{v}$$

$$y_i = e_{yi} + \frac{y'_i}{v}$$

where i stands for 1 to 4.

The adjusting or setting values for the rectification are computed by the computer 7 under use of the coordinates $x_i$ and $y_i$ and the known nominal coordinates of the control points 1 to 4 stored in the computer 7 according to generally known projective relationship between photograph and map as, for example, described in Gruber: Photogrammetry, Chapman & Hall Ltd. London, 1932, page 13 ff.

The obtained setting values are subsequently used to control the image carrier, the objective and/the projection table in the course of producing the rectified photograph by the computer.

The respective displacement means required for performing the necessary displacements and tiltings are omitted for sake of simplicity since these are so widely known in the art that they need not be described specifically.

It is self-understood that the displacements are performed by drive-spindles or other suitable gear means, that the displacements are converted into corresponding electric signals by means such as rotary encoders and that a two way signal connection exists between the computer and the displacement means.

We claim:

1. A photogrammatic rectifying device of the non-tilting lens type comprising
   a light source for emitting a projection beam,
   a condenser lens for shaping said projection beam,
   an aerial photograph to be rectified,
   a carrier means for mounting said photograph,
   at least three control points,
   an objective lens having an optical axis,
   a projection table having four quadrants,
   at least one measuring mark being provided in each of said four quadrants,
   said light source, said condenser lens, said carrier means,
   said objective lens and said projection table being subsequently arranged in optical alignment about said optical axis,
   means for displacing said carrier means about two coordinate directions at right angles to said optical axis, a computer,
   means for varying the magnification of said objective lens,
   said control points being provided in the plane of said photograph non-coincident to said optical axis,
   said objective lens being for focusing said projection beam into a plane defined by said projection table,
   means for connecting said computer to said means for displacing and to said means for varying the magnification of said objective lens,
   said projection beam being for imaging said control points into the plane of said projection table,
   said means for displacing said carrier means in combination with said means for varying the magnification of said objective lens being for aligning said control points relative to said measuring mark in a respective one of said four quadrants,
   said means for displacing said carrier means further being for providing respective carrier means displacement values,
   said means for varying the magnification of said objective lens further being for providing magnification variation values,
   said means for connecting said computer to said means for displacing and to said means for varying said magnification being for feeding said respective displacement values and the magnification variation values, respectively, into said computer.

2. A photogrammetric rectifying device as claimed in claim 1, wherein said computer includes storing means.

3. A method for determining the setting values for performing rectification in a photogrammetric rectfying device comprising the steps of
   displacing a photograph carrier by operating a displacement means and varying the magnification of a projection via an objective adjustment means, respectively, to align a control point relative to a respective measuring mark on a projection table,
   measuring the displacement values and magnification variation values and feeding the values into a computer,
   repeating the steps of displacing and measuring for at least two further control points on said photograph to be rectified,
   computing the setting values for the setting of the rectifying device from said individual displacement values and the magnification varying values, respectively, in dependence on nominal coordinate values for the respective control points involved stored in the computer, and
   feeding said setting values to a photograph carrier tilting and displacement means, to the projection objective lens displacement means, and to a projection table tilting means, respectively, for performing rectification of a photograph to be rectified.

* * * * *